L. P. HALLADAY.
SHOCK ABSORBER FOR ROAD VEHICLES.
APPLICATION FILED JAN. 22, 1919.
1,316,029.  Patented Sept. 16, 1919.
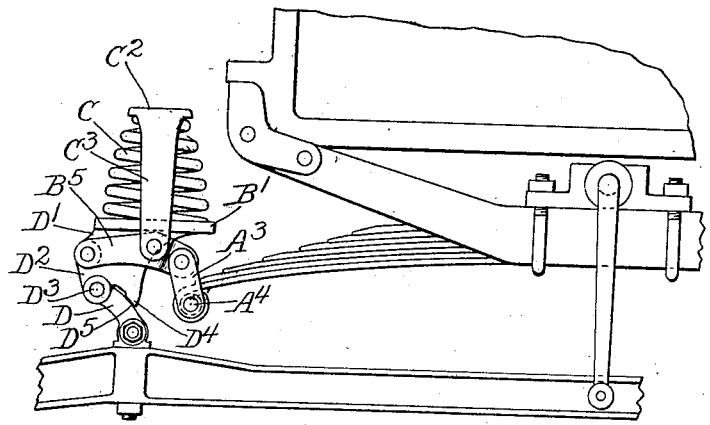
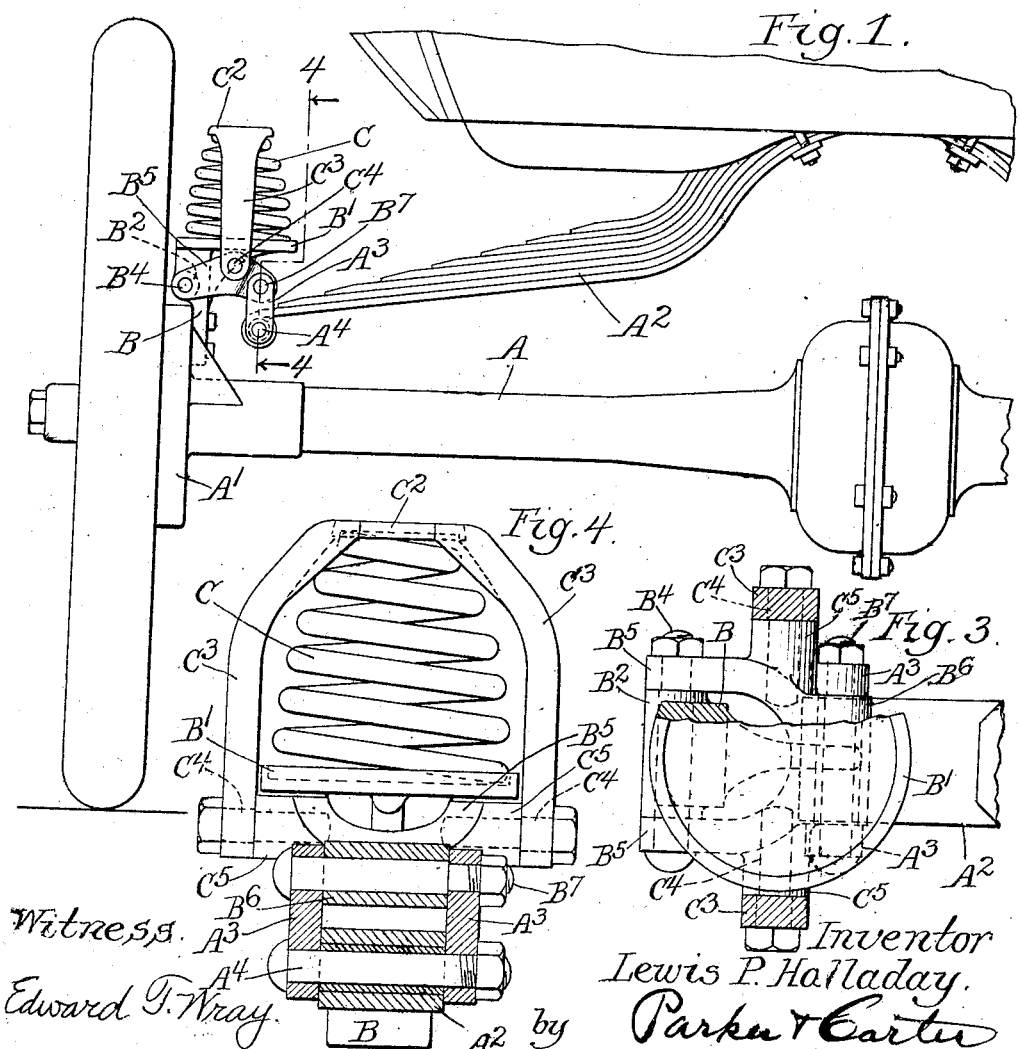
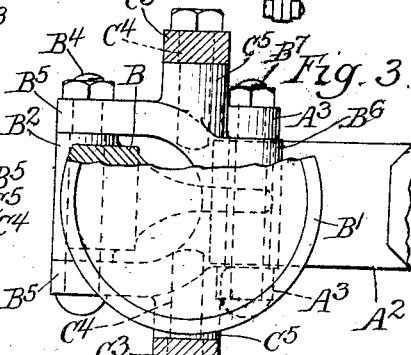
Witness
Edward T. Wray
Inventor
Lewis P. Halladay
by Parker & Carter
Attorneys

UNITED STATES PATENT OFFICE.

LEWIS P. HALLADAY, OF STREATOR, ILLINOIS.

SHOCK-ABSORBER FOR ROAD-VEHICLES.

1,316,029.

Specification of Letters Patent. Patented Sept. 16, 1919.

Application filed January 22, 1919. Serial No. 272,426.

*To all whom it may concern:*

Be it known that I, LEWIS P. HALLADAY, a citizen of the United States, residing at Streator, in the county of La Salle and State of Illinois, have invented a certain new and useful Improvement in Shock-Absorbers for Road-Vehicles, of which the following is a specification.

My invention relates to improvements in shock absorbers or auxiliary springs such as may be used for any type of vehicle but are particularly appropriate for use with the well known Ford automobile. One object is to provide a new and improved form of auxiliary spring suspension wherein a strong and sturdy spring may be used. Another object is to provide a cheap, convenient and satisfactory arrangement making possible the use of a conical spring with the accompanying increase in resiliency and flexibility and response to pressure throughout the entire length thereof. Other objects will appear from time to time throughout the specification.

Figure 1 is an elevation of a portion of an automobile with parts omitted to show my device;

Fig. 2 is a rear elevation of the front with parts omitted showing the way in which the device is applied to the front axle of a Ford car;

Fig. 3 is a plan view of the spring platform shown in Figs. 1 and 2 with parts in section;

Fig. 4 is a section along the line 4—4 of Fig. 1.

Like parts are indicated by like letters in all the figures.

A is the rear axle of the automobile. $A^1$ is the brake drum. $A^2$ is a cross type spring. $A^3$ $A^3$ are links pivoted on the spring pin $A^4$ at the end of the spring, the links being arranged one on either side of the spring adjacent the ends of the pin.

B is a spring bracket bolted to the brake drum. It is bored out as indicated and carries a round auxiliary spring platform $B^1$. $B^2$ is an apertured bearing sleeve at one side of the platform. Through it passes a pivoted pin $B^4$ upon either end of which is rotatably mounted the ends of a forked lever $B^5$. This forked lever $B^5$ is elbow shaped as indicated and terminates at its outer ends in a bearing sleeve $B^6$ through which passes a pin $B^7$ supporting the free ends of the links $A^3$.

C is a spiral conical spring of beehive shape having its broad base resting upon the spring seat $B^1$. $C^2$ is a circular stirrup cap preferably surrounding the upper end of the spring and supported thereon. Downwardly depending from this stirrup cap are supporting arms $C^3$ extending down one on either side of the spring seat and apertured to engage the pins $C^4$ which pass through bearing sleeves $C^5$ at the upper angular central portion of the lever in such wise that a clockwise rotation of the lever about the pin $B^4$ will result in pulling down on the stirrup and compressing the spring. The parts being so arranged that when in operative position with the normal weight on the car, the line joining $B^4$ and $C^4$ is substantially horizontal so that the contraction and expansion of the coil spring will cause that line to move slightly above and below the horizontal position and thus above and below the position of perpendicularity to the axis of the coil spring, so that the twisting or rocking of the spring as a result of angular displacement of the stirrup will be minimized and that there will be practically no opportunity for the coil spring to carry any portion of the twisting load as that is all taken care of by the lever relation.

In Fig. 2 is shown the slight modification necessary to adapt this device for the front axle of the car.

D is a spring perch. It will be noted that it is turned outwardly instead of inwardly and that is done by just changing the perches putting the right hand one on the left end of the axle and vice versa. The bracket $D^1$ which in every other respect is the same as the bracket B is provided with a downwardly extending lug $D^2$ through which passes a pin $D^3$ to hold it in position with the bearing surface $D^4$ resting at $D^5$ on the spring perch D. Aside from that the structure is identical with that already described.

It will be evident that while I have shown in my drawings an operative device, still many changes might be made both in size, shape and arrangement of parts without departing materially from the spirit of my invention, and I wish, therefore, to have my drawings considered as in a sense diagrammatic.

The use and operation of my invention are as follows:—

In applying the device to a motor vehicle in which the old type of spring suspension has been used, the front spring perches are reversed as indicated and the rear spring perches are removed. My preferred form of spring bracket is put in place as indicated with the lever, stirrup, coil spring and the like all assembled. The same spring links which previously went from the spring to the spring perch or bracket are coupled up to the free end of the lever and the load of the car is allowed to settle down upon the coil spring. The weight of the car holds all the parts in proper assembly and operating position and that is all that is necessary. The long conical coil spring is sturdy and durable but yet gives to the slightest vibration or bump throughout its entire length and the use of this lever and spring arrangement really results in effect in lengthening the effective length of the spring and making a much smoother, easier riding vehicle and because of the sensitive characteristics of the coil spring the stiff and rigid flat leaf spring is permitted to give for heavy shocks and jolts but the vehicle is protected from slight vibrations by the ready operation of the coil spring.

I claim:

1. A spring suspension for vehicles comprising a bracket adapted to be secured to the running gear, a spring supporting platform projecting laterally therefrom, a conical beehive spring thereupon, a lever pivoted at one end upon said bracket and connected at its other end by a link to the leaf spring directly supporting the body of said vehicle, a stirrup resting upon the top of said conical spring extending below it and pivoted on both sides to said lever intermediate its ends.

2. A spring suspension for vehicles comprising a bracket adapted to be secured to the running gear, a spring supporting platform projecting laterally therefrom, a conical beehive spring thereupon, a lever pivoted at one end upon said bracket and connected at its other end by a link to the leaf spring directly supporting the body of said vehicle, a stirrup resting upon the top of said conical spring extending below it and pivoted on both sides to said lever intermediate its ends, said stirrup touching said conical spring on its top only.

3. A spring suspension for vehicles comprising a bracket adapted to be secured to the running gear, a spring supporting platform projecting therefrom, a conical beehive spring thereupon, a lever pivoted at one end upon said bracket and connected at its other end by a link to the leaf spring directly supporting the body of said vehicle, a stirrup resting upon the top of said conical spring extending below it and pivoted to said lever intermediate its ends, said stirrup touching said conical spring on its top only.

4. A spring suspension for vehicles comprising a bracket adapted to be secured to the running gear, a spring supporting platform projecting laterally therefrom, a coil spring thereupon, a lever pivoted at one end upon said bracket and connected at its other end by a link to the leaf spring directly supporting the body of said vehicle, a stirrup resting upon the top of said coil spring extending below it and pivoted on both sides to said lever intermediate its ends.

5. A spring suspension for vehicles comprising a bracket adapted to be secured to the running gear, a spring supporting platform projecting laterally therefrom, a single coil spring thereupon, a lever pivoted at one end upon said bracket and connected at its other end by a link to the leaf spring directly supporting the body of said vehicle, a stirrup resting upon the top of said coil spring extending below it and pivoted on both sides to said lever intermediate its ends.

In testimony whereof, I affix my signature in the presence of two witnesses this 30th day of December, 1918.

LEWIS P. HALLADAY.

Witnesses:
GEORGE G. HOOD.
W. J. HEINEKE.